(12) United States Patent
Schauder

(10) Patent No.: US 6,433,520 B1
(45) Date of Patent: Aug. 13, 2002

(54) DC POWER REGULATOR INCORPORATING HIGH POWER AC TO DC CONVERTER WITH CONTROLLABLE DC VOLTAGE AND METHOD OF USE

(75) Inventor: Colin David Schauder, Murrysville, PA (US)

(73) Assignee: Siemens Power Transmission & Distribution Inc, Wendell, NC (US)

( * ) Notice: Subject to any disclaimer, the term of this patent is extended or adjusted under 35 U.S.C. 154(b) by 0 days.

(21) Appl. No.: 09/867,165

(22) Filed: May 29, 2001

(51) Int. Cl.[7] .................................................. G05F 3/06
(52) U.S. Cl. ........................................................ 323/207
(58) Field of Search ................................. 323/205, 207, 323/208, 209; 363/39, 40, 44, 50, 52, 53, 55

(56) References Cited

U.S. PATENT DOCUMENTS

| | | | |
|---|---|---|---|
| 5,198,746 A | | 3/1993 | Gyugyi et al. |
| 5,329,222 A | | 7/1994 | Gyugyi et al. |
| 5,343,139 A | | 8/1994 | Gyugyi et al. |
| 5,642,007 A | | 6/1997 | Gyugyi et al. |
| 5,814,975 A | * | 9/1998 | Nelson et al. ............... 323/207 |
| 6,144,191 A | * | 11/2000 | Raedy ......................... 323/207 |
| 6,225,791 B1 | * | 5/2001 | Fuji et al. .................... 323/207 |
| 6,329,798 B1 | * | 12/2001 | Huggett et al. .............. 323/207 |

* cited by examiner

Primary Examiner—Matthew Nguyen

(57) ABSTRACT

A high power dc power regulator utilizes a voltage sourced inverter connected on the ac side in series with a large inductance to an ac power system through a coupling transformer. The dc side of the inverter is connected to the dc load. The inductance is sized such that the voltage at the ac terminals of the inverter can be varied from zero to a maximum specified value for use, for example, in melting ice on transmission lines. As there is only infrequent need for ice melting operation, the large inductance can be shunted and the dc load disconnected so that the inverter may be operated for the majority of the time as a conventional STATCOM to provide reactive compensation for the ac power system.

16 Claims, 6 Drawing Sheets

DC POWER REGULATOR INCORPORATING HIGH POWER AC TO DC CONVERTER WITH CONTROLLABLE DC VOLTAGE AND METHOD OF USE

BACKGROUND OF THE INVENTION

FIELD OF THE INVENTION

This invention relates to high power static inverters that can be operated as a dc source having a controlled dc output voltage with an exemplary application to providing ice melting on electric power transmission lines and, when not so needed, providing reactive compensation to a transmission line.

BACKGROUND INFORMATION

Large voltage sourced inverters have been developed for use in the shunt compensation of electric power transmission systems (STATCOM) and other applications. Typically, these inverters operate with substantially constant dc terminal voltage and are connected to ac power systems through minimal tie reactance. The leakage reactance of the coupling transformer (typically 15%) may be the only tie reactance. If it is desired to connect a source or sink of real power to the dc terminals of such an inverter, then an additional dc—dc chopper is usually required to regulate the dc terminal voltage of the inverter down to the voltage level required by the dc load.

Recently, a unique application for high power dc power sources has emerged. In very cold conditions, ice buildup on ac transmission lines has caused serious problems. Under these conditions, it has been proposed to drive a large dc current through the (de-energized) transmission cables to cause enough heating to melt the ice. This application requires a very high power (hundreds of megawatts) dc supply with a dc voltage that can be regulated from zero to a specified maximum. A prior solution to this problem would be to use a line-commutated thyristor converter to deliver the controlled dc power to the load. Apart from other considerations, this solution is unattractive because the ice melting is rarely required and the thyristor converter would provide no useful function for the majority of the time.

There is a need therefore for an improved high powered dc source in which the dc voltage can be controlled from zero to a specified maximum

SUMMARY OF THE INVENTION

This need and others is satisfied by the invention in which a conventional STATCOM is modified for alternative use as a high-power voltage-regulated dc power source. This is an attractive solution for certain applications where the reactive power capability of a STATCOM is generally required, but the equipment would occasionally be required to operate instead as a large regulated dc power supply. It may also find use in other applications where a large regulated dc power supply is required with very high quality sinusoidal input current and very low ripple in the dc output voltage. The invention has particular relevance in providing the high dc power with a regulated dc voltage from zero to a specified maximum value required for melting ice on electric power transmission lines.

More particularly, the invention is directed to a dc power regulator for connecting an ac power supply to a dc load and controlling the voltage applied to the dc load. The regulator comprises an inverter. An input circuit including an inductance is connected between the ac terminals and the ac power supply. This inductance is scaled to maintain current drawn through the ac terminals below a rated maximum level for the inverter when the voltage at the ac terminals is zero. An output circuit connects the dc terminals of the inverter to the load and a controller controls the inverter to generate a selected dc voltage at the dc terminals of the inverter.

The regulator can comprise a first switch device shunting the inductance when closed, and the output circuit includes a second switch device disconnecting the dc load from the dc terminals of the inverter when open. The controller can operate the inverter to provide reactive compensation to the ac power supply with the first switch device closed and the second switch device open.

Another aspect of the invention is directed to apparatus for melting ice on an electric power transmission line using power from an ac transmission system. An input circuit comprises a coupling transformer connected in shunt with the ac transmission system, and an inductance connected in series with the ac terminals of an inverter and the coupling transformer. Again, the inductance is scaled to maintain current drawn through the ac terminals of the inverter below a rated maximum level for the inverter when voltage at the ac terminals is zero. An output circuit connects the dc terminals of the inverter to the electric power transmission line and a controller controls the inverter to produce a dc voltage at the dc terminals selectively variable between about zero and a maximum dc value.

The invention further embraces a method of providing dc power to a load from an ac transmission system by connecting the load to the dc terminals of an inverter, connecting the ac terminals of the inverter to the ac transmission system through an inductance having a value sufficient to maintain the current drawn through the ac terminals below a rated maximum level for the inverter when the voltage at the ac terminals is zero, and operating the inverter to produce a dc voltage at the dc terminal which varies from about zero up to a maximum dc value. Operating the inverter can comprise phase adjustment of the ac voltage at the ac terminals of the inverter relative to voltage on the ac transmission line or generating dc voltage at the dc terminals as a function of the magnitude of the ac voltage and adjusting the function to adjust the magnitude of the dc voltage. Alternatively, the dc load can be disconnected from the dc terminals, the inductance can be shunted, and the inverter operated to provide reactive compensation to the ac transmission system.

The invention further embraces a method of melting ice on an electric power transmission line using power from an ac transmission system by: connecting ac terminals of the inverter to the ac transmission system, connecting dc terminals of the inverter to the electric power transmission line, operating the inverter to generate a controlled dc voltage at the dc terminals that increases to a selected maximum value and then decreases towards zero, and limiting current provided to the ac terminals of the inverter from the ac transmission system to a rated maximum level. When the inverter is not needed to melt ice, the dc terminals can be disconnected from the electric power transmission line, the inductance can be shunted and the inverter can be operated to provide reactive compensation to the ac transmission system.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
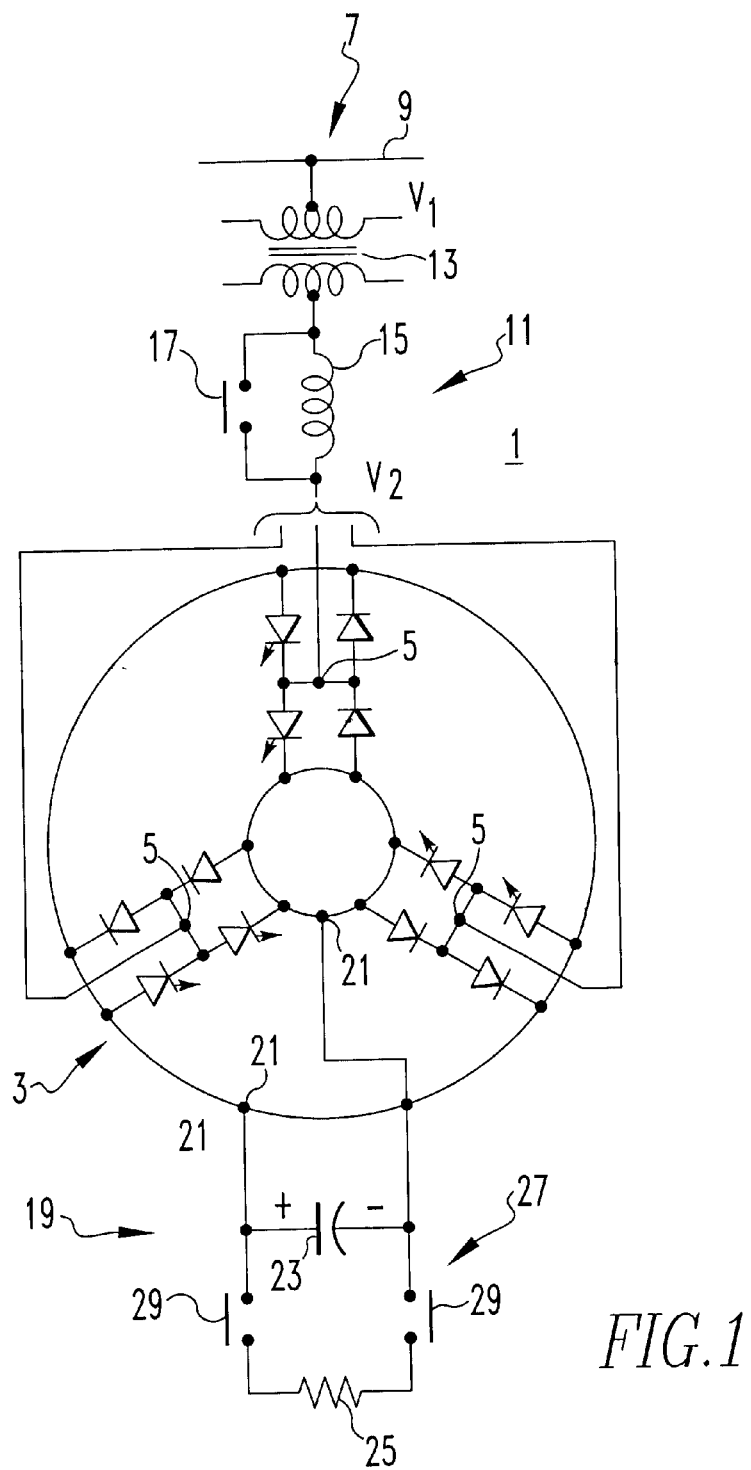
FIG. 1 is a symbolic representation of a high power dc power regulator in accordance with the invention.

FIG. 1 illustrates a dc power regulator 1 incorporating the invention. The regulator 1 uses a high-power voltage-sourced inverter 3 as a synchronous ac voltage source or "electronic generator" connected at its ac terminals 5 to an ac power supply 7 which includes an ac transmission line 9 through an input circuit 11. The input circuit 11 includes a coupling transformer 13, shunt connected with the ac transmission line 9 and an inductance 15 connected in series with the ac terminals 5 of the inverter 3 to the coupling transformer 13. The inductance 15 is shunted by a first switching device 17.

An output circuit 19 connected to the dc terminals 21 of the inverter 3 includes a capacitor 23 and a dc load 25, such as the resistance of an electric power transmission line to be deiced, connected in parallel with the capacitor 23 through a second switching device 27 consisting of the switches 29. As indicated in FIG. 1, the system is three phase, although all of the components except the inverter are shown in single-line for simplicity.

* With the first switch device 17 closed to shunt the inductance 15 and the second switching device 27 open, the configuration is that of the conventional STATCOM. In the STATCOM application, the voltage $V_2$ at the ac terminals 5 of the inverter 3 is maintained in phase with the line voltage $V_1$ on the transmission line 9 and is controlled in magnitude. When the inverter voltage $V_2$ exceeds the line voltage $V_1$, the inverter output current leads the voltage $V_2$ and appears capacitive as viewed from the ac transmission line 9. When the inverter voltage $V_2$ is lower than the line voltage $V_1$ the current reverses and appears inductive. Generally, the only inductance in the STATCOM application between the inverter 3 and the ac transmission line 9 is the leakage reactance of the coupling transformer 13. Keeping this tie reactance low helps to reduce the STATCOM voltage rating.

As discussed, there is an emerging interest in melting ice on power transmission lines by passing dc currents through the transmission cables. The effective level of current is reported as about 7,200 A and the dc voltage required depends on the resistance of the circuit. A proposed prototype application would require 8,000V dc to drive the current (i.e., 57.6 MW). Further full scale installation being considered would require approximately 50 kV dc for the same current.

Although large line-commutated thyristor converters could be built to provide a controlled source of dc power for these applications, this costly equipment would not be useable for any other purpose and would only provide value on very rare occasions when ice buildup occurs. I have found that STATCOM equipment can provide a novel, cost-effective alternative solution. The STATCOM can be used throughout the year to provide fast reactive power for voltage support and power oscillation damping, and the same equipment, with very little reconfiguration, can also perform the ice melting function when needed.

In a conventional STATCOM application, the inverter ac terminal voltage changes very little over the range of reactive operation. In general, the inverter dc terminal voltage always has a minimum value determined by the sine wave peak of the existing inverter ac terminal voltage. The dc voltage may be higher than this minimum value (depending on the type of inverter), but can never be lower. If a resistive load is connected to the dc terminals of the inverter, it would not generally be possible to regulate the dc voltage down to zero. With the ice melting application, however, a regulated dc voltage must be provided from zero to a maximum specified value. I propose a novel method of achieving the desired range of dc control. This is done by means of a simple reconfiguration of the STATCOM power circuit when it is needed for ice melting. For this application, the first switch device 17 is opened to insert the inductance 15 in series with the ac terminals 5 of the inverter 3. This inductance 15 is a large three-phase ac reactor having an inductance scaled to maintain the current drawn through the ac terminals 5 of the inverter 3 below a rated maximum level for the inverter when the voltage at these terminals is zero. For example, the inductance 15 can have an inductive value of approximately 1 pu (per unit). On the dc side of the inverter 3, the switches 29 of the second switch device 27 are closed to connect the resistive load 25 of the electric power transmission line to be deiced across the dc terminals 21 of the inverter.

Figure 2:
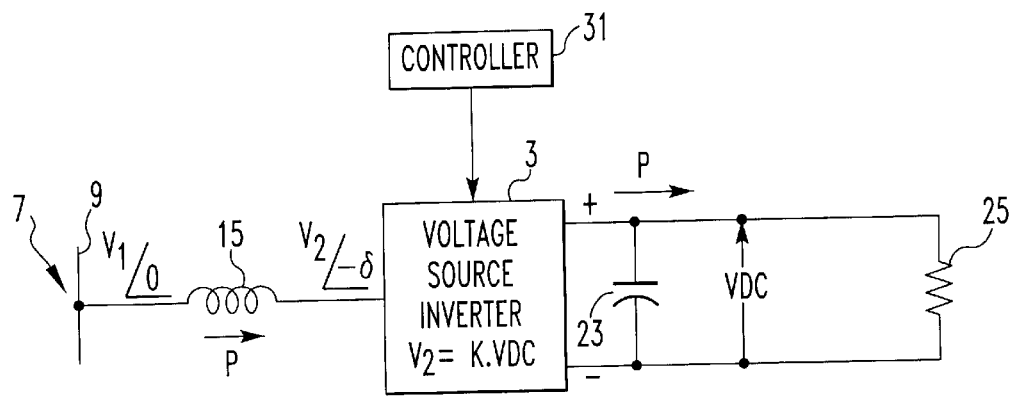
FIG. 2 is an electrical equivalent circuit of the dc power regulator of FIG. 1.

The electrical equivalent of the power circuit configured for the ice melting application where the first switch device 17 is open and the second switch device 27 is closed, is shown in FIG. 2. On the ac side, the inverter 3 appears as a low impedance synchronous voltage source with a phase angle that is entirely determined by the inverter controller 31. This controller 31 can therefore maintain an arbitrary angle, *, between the system voltage, $V_1$, and the inverter voltage, $V_2$. The magnitude of $V_2$ is always proportional to the dc side voltage of the inverter, $V_{DC}$, so that $V_2=k \cdot V_{DC}$, where k may be a constant or can be controlled from zero to $k_{max}$, depending on the type of inverter.

Referring to FIG. 2, it can be seen that the real power flow at the ac terminals of the inverter 3 is given by the familiar power transmission equation:

$$P = V_1 \cdot V_2 \cdot \sin(*)/X \qquad \text{Eq. (1)}$$

Where X is the impedance of the inductance 15.

And on the same three-phase power base, the real power delivered to the load at the dc terminals is:

$$P = (V_{DC})^2/3R \qquad \text{Eq. (2)}$$

Where R is the resistance of the load 25.

Neglecting the losses in the inverter, the power expressed in Eqs. 1 and 2 must be equal, so:

$$V_1 \cdot V_2 \cdot \sin(*)/X = (V_{DC})^2/3R \qquad \text{Eq. (3)}$$

and substituting $V_2 = k \cdot V_{DC}$ in Eq. 3, we obtain:

$$V_2 = (V_1/X) \cdot (k^2 \cdot 3R) \cdot \sin(*) \qquad \text{Eq. (4)}$$

and:

$$V_{DC} = (V_1/X) \cdot (k \cdot 3R) \cdot \sin(*) \qquad \text{Eq. (5)}$$

Figure 3:
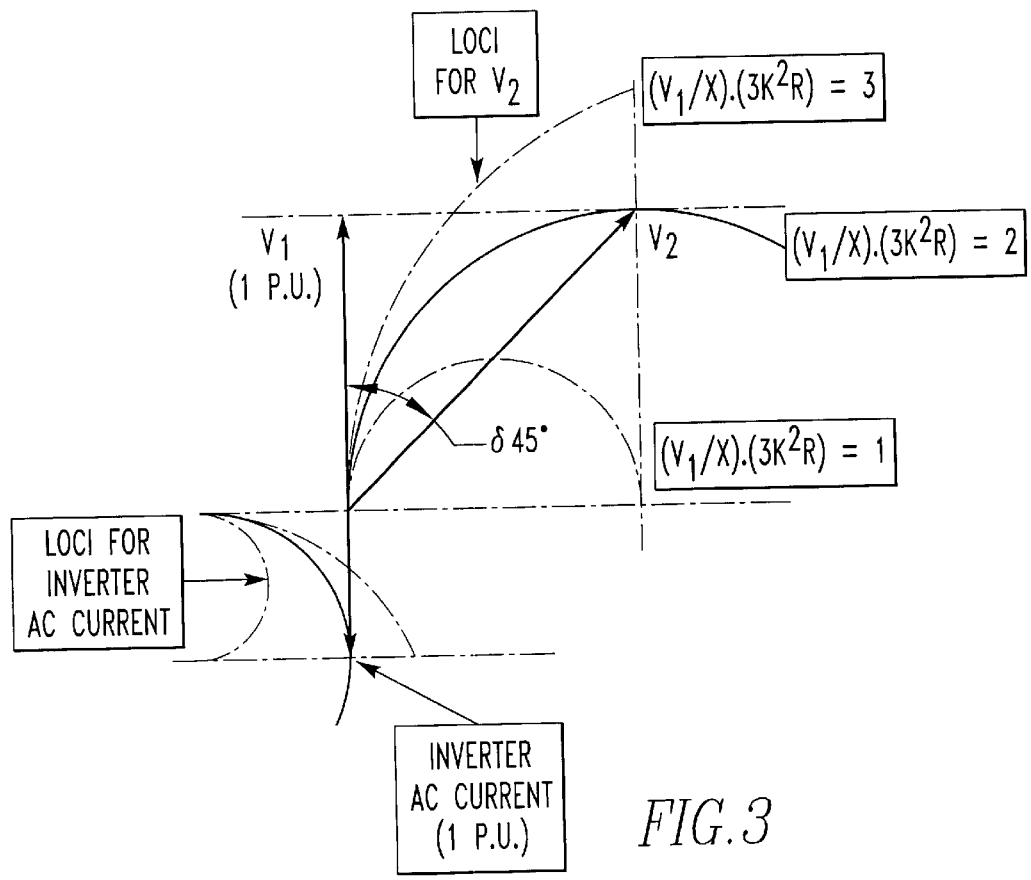
FIG. 3 illustrates three examples of operating loci for the dc power regulator of FIGS. 1 and 2.

According to Eq. 4, if the values of all other quantities are constant, then the phasor representing $V_2$ lies on a semi-circular locus when plotted as a function of *. Three such loci are plotted in FIG. 3 for different values of $(V_1/X) \cdot (k^2 \cdot 3R)$ and where $V_{1=1}$, X=1 and k=constant.

Each operating point on these semi-circular loci is uniquely associated with a particular value of *, and also produces a unique output current loading on the ac side of the inverter. The associated ac current phasor loci are also plotted in FIG. 3. With the particular parameters chosen for FIG. 3, the locus for P=1 is the dashed vertical line. Where this line intersects the circular loci of $V_2$ we obtain the full (base) power operating points. The dc voltage applied to the load can be regulated from the full load value down to zero by progressively reducing the value of * to zero.

Figure 4:
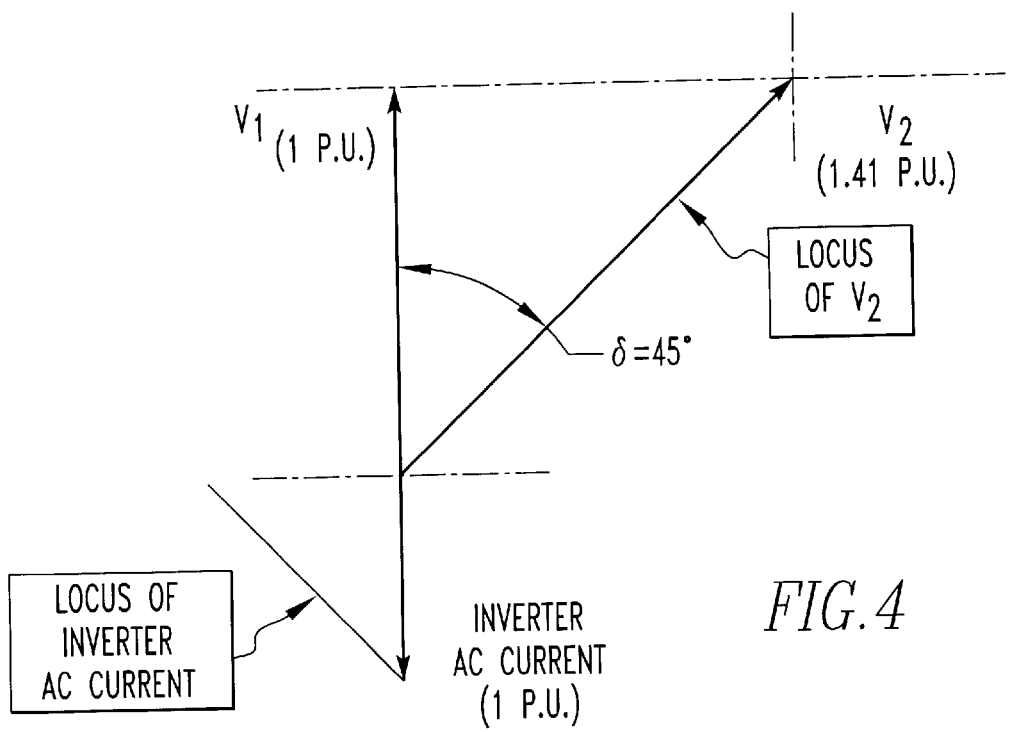
FIG. 4 illustrates regulation of the dc voltage of the power regulator by controlling the inverter's duty cycle.

Examination of Eq. 5 shows another important result. The magnitude of VDC is directly proportional to the value of k. Thus, if the value of * is chosen (and held constant) to give a suitable full load operating point with $k = k_{max}$, then the dc voltage can be regulated between this point and zero, simply by changing the value of k from 0 to $k_{max}$. The corresponding locus for $V_2$ and the STATCOM current is illustrated in FIG. 4 for one of the cases shown in FIG. 3. In the example, *=45° and X=1.

There are several important design factors to be taken into account to ensure that the STATCOM will be able to deliver the specified power to the ice-melting load, and that smooth control of dc voltage will also be available from zero to the specified maximum. The design procedure will be briefly described and then illustrated with a numeric case corresponding to the pilot installation.

The design process starts with the specification of the dc load at the nominal full load operating point. This fixes the value of $V_{DC}$ and R at full load. $V_2$ is also fixed if we assume $k=k_{max}$ at full load. Furthermore, the quantity $(V_1/X)$ can be assigned a value, $I_{SC}$, equal to the maximum inverter current that can be tolerated at startup (when $V_2=0$). Then we obtain the following formula from Eq. 4:

$$* = \sin^{-1}(V_2/((V_1/X) \cdot (K^2 \cdot 3R))) \qquad \text{Eq. (6)}$$

Eq. 6 determines the angle * at the full load operating point. Next, it is necessary to determine the full load ac current of the STATCOM. Typically the desired value, $I_{f1}$, is set by the capability of the inverter hardware, so we have the following equations:

$$V_1/X = I_{SC} \qquad \text{Eq. (7)}$$

and:

$$V_{12}/X = I_{f1}, \qquad \text{Eq. (8)}$$

where $V_{12}$ is the magnitude of the voltage across the reactor, 15, at full load. Then:

$$V_1/V_{12} = I_{SC}/I_{f1} \qquad \text{Eq. (9)}$$

Figure 5:
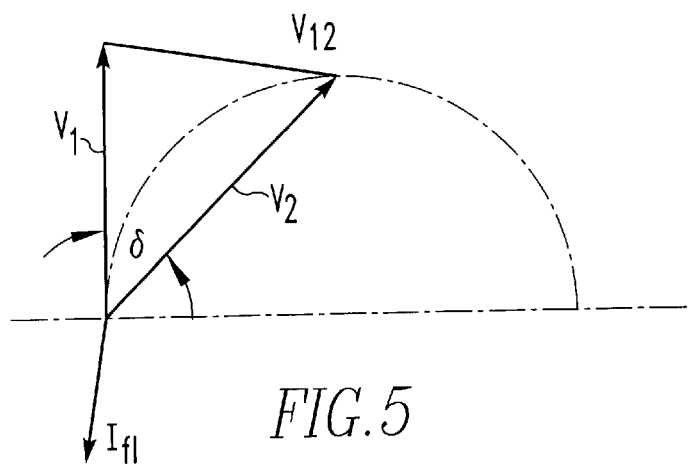
FIG. 5 is a phasor triangle that can be used in determining the value of the inductance used in the dc power regulator of the invention.

Eq. 9 provides enough information to solve the phasor triangle shown in FIG. 5 for the value of $V_1$ and hence, by substitution in Eq. 7 or 8, the value of X. From these calculations the rating of all major circuit components follows in a straightforward way and the rating of the equipment for normal STATCOM operation (X bypassed) can also be determined.

Now consider the case of the pilot installation mentioned above:

$$V_{DC}=8000\ V;\ R=1.1\Sigma;\ k_{max}=(8/B\{2\})$$

$$I_{SC}=1556\ A;\ I_{f1}=1556\ A$$

Then $V_2$=14407 V/phase, and solving we obtain *=59.02° Solving the phasor triangle, $V_1$=13994 v/phase:

$$X=8.99\Sigma\ \text{(per phase), at 13994 V, 1556 A.}$$

Reactor (total 3-phase) VA rating=65.32 MVA. In practice, the reactor will be sized about 15% smaller than the value calculated above to take account of the leakage reactance of the main coupling transformer. This gives an actual reactor rating of about 18.5 MVA per phase (55.52 MVA total).

Transformer rating=65.32 MVA; Secondary=13994V/phase; 1556 A.

For ice melting, the ac system sees 57.68 MW real power load and 30.66 MVA lagging reactive power. Power factor== 0.883.

Rating for STATCOM duty=+/−65.32 MVA.

Figure 6:
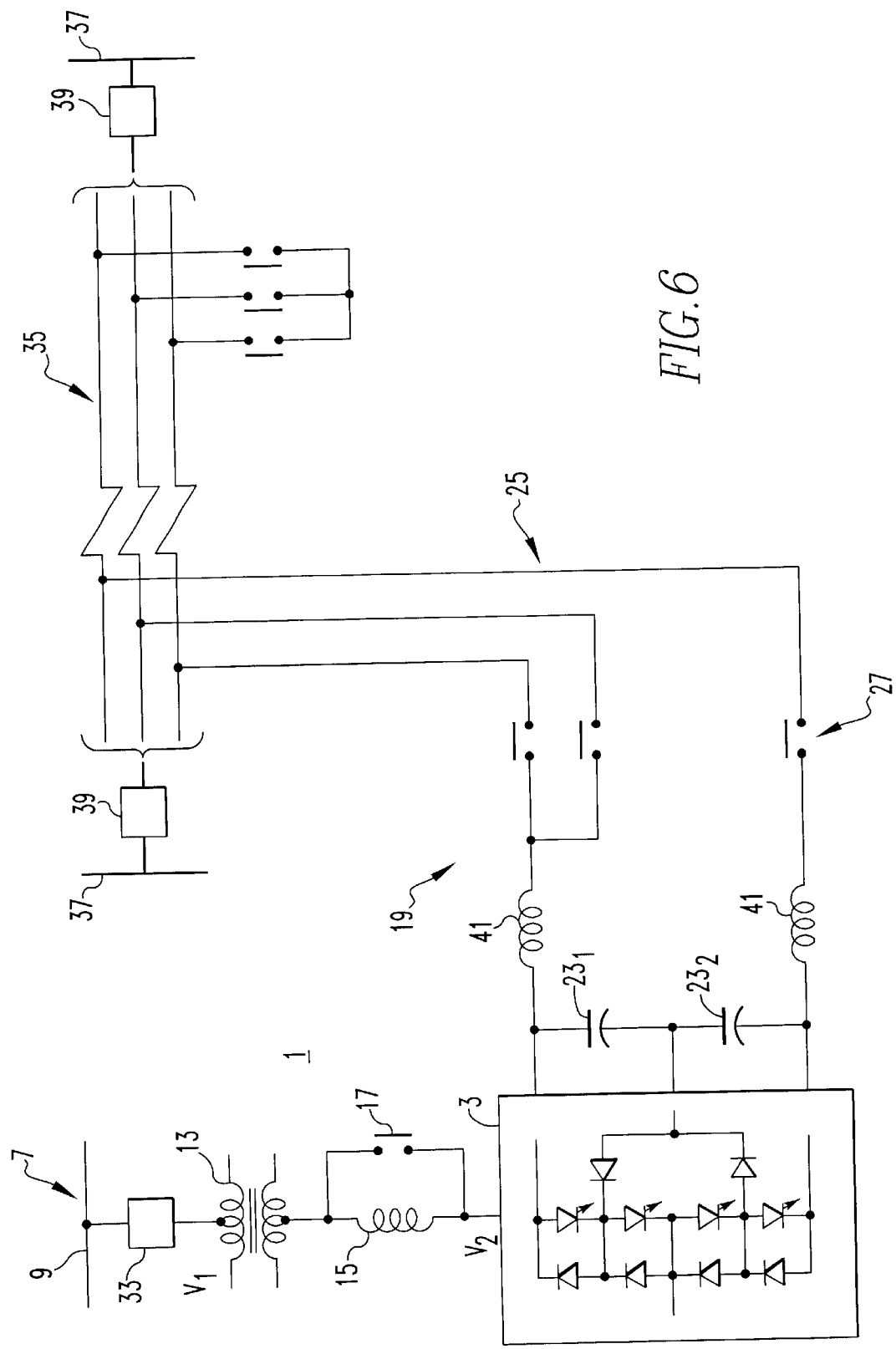
FIG. 6 is a one-line diagram for a pilot installation of the dc regulator used for melting ice on electric power transmission lines.

FIG. 6 illustrates a one-line diagram of the main features of a STATCOM/ice-melter pilot installation. In this installation, the inverter 3 is a three-level inverter, hence, the capacitor is divided into two capacitors $23_1$ and $23_2$ as is well known. Also, the coupling transformer is connected to the ac transmission line 9 through a circuit breaker 33. The load 25 is the three-phase electric power transmission line 35 which is to be deiced. This transmission line 35 is fed by 735 kV buses 37 at either end through circuit breakers 39. The second switch device 27 is a 735 kV MOD (motor operated disconnect).

Assuming that the installation is initially operating as a STATCOM, there are two possible procedures for the ice-melter startup, depending upon whether the reactor bypass switch 17 is a MOD (not rated to break current) or a circuit switcher or breaker (capable of interrupting some load current). For the case of an MOD bypass switch 17, startup would be as follows:
1. Shut down STATCOM, open 230 kV breaker 33
2. Close 735 kv MOD's 27
3. Open bypass MOD's 17 on 3×18.5 MVA reactors 15
4. Go online with $V_2$ controlled to zero; close 230 kV breaker 33
5. Regulate dc voltage up to 8 kV slowly
6. Maintain 8 kV dc until melting cycle complete Note that step 4 will cause an asymmetric current transient when the 230 kV breaker 33 is closed, due to the inverter 3 holding $V_2$ to zero during this period.

Alternatively, if a circuit breaker (or switcher) is used for the bypass switch 17, the following procedure can be used:
1. Take STATCOM 3 to zero load operation and open bypass breaker 17 "on-the-fly"
2. Regulate dc voltage down to zero by maintaining a small positive value of *
3. Hold $V_2$ to zero with inverter midpoint valves ON, and close 735 kV MOD's 27
4. Regulate dc voltage up to 8 kV slowly and maintain until melting completed The procedure for shutting down the ice-melter and returning to normal STATCOM operation would be as follows:
1. Regulate dc voltage down to zero slowly
2. Open 230 kV breaker 33
3. Open 735 kV MOD's 27
4. Close bypass switches 17 on 3×18.5 MVA reactors
5. Go online; close 230 kV breakers 33
6. Normal STATCOM operation Note that the ac power system 7 will be loaded with 65 MVA (inductive) during the periods when the dc bus voltage is regulated to zero. It is understood that the system has excess reactive power for voltage support under these conditions and that the brief intervals of heavy inductive loading may be acceptable. Alternatively, the design could be changed to incorporate compensating capacitors.

Figure 7A:
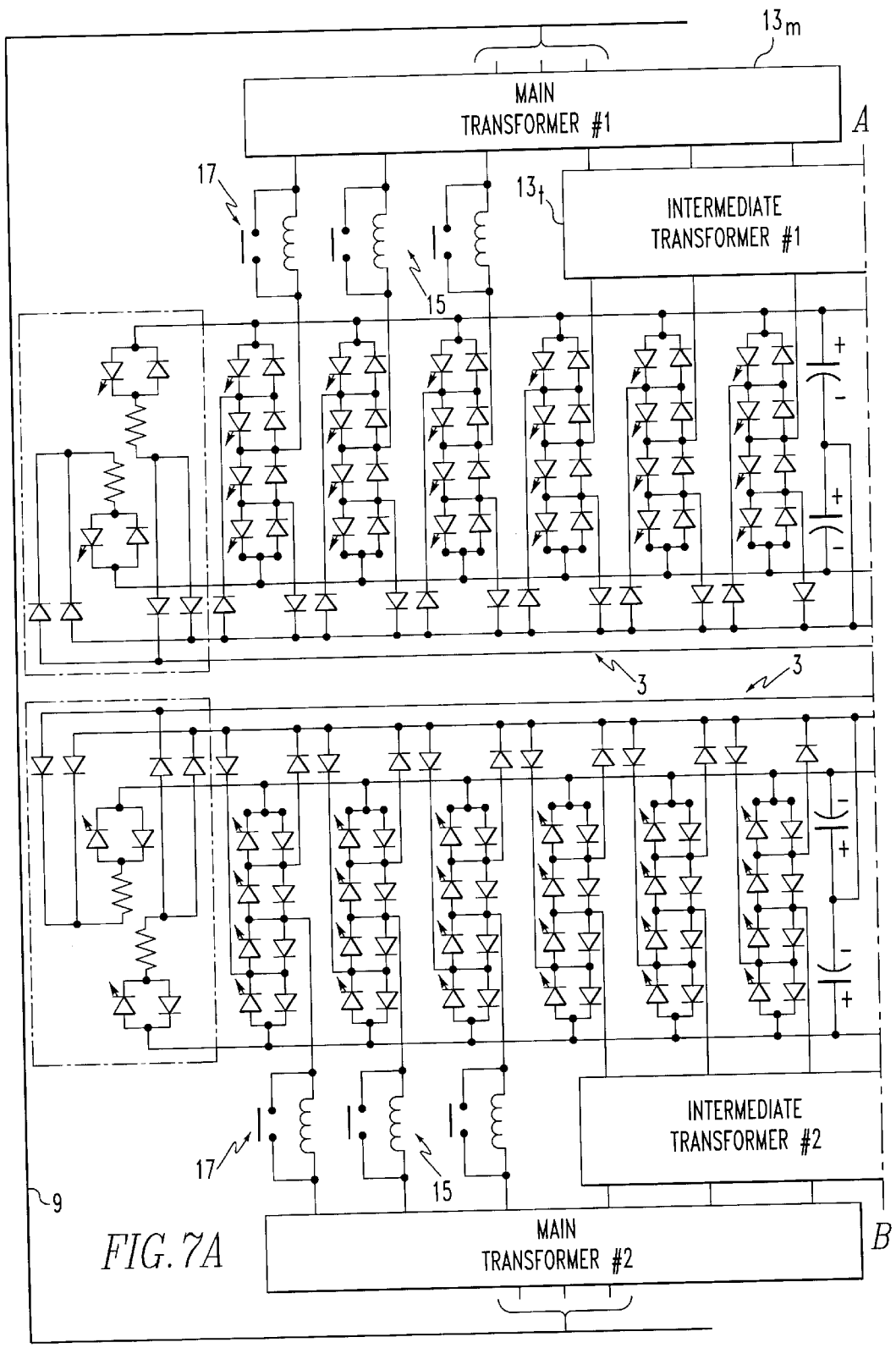
FIGS. 7A and 7B, when joined along the line A, B, show a schematic diagram of a high voltage dc power regulator utilizing two STATCOM inverters connected in series at their dc terminals for ice melting.
Figure 7B:
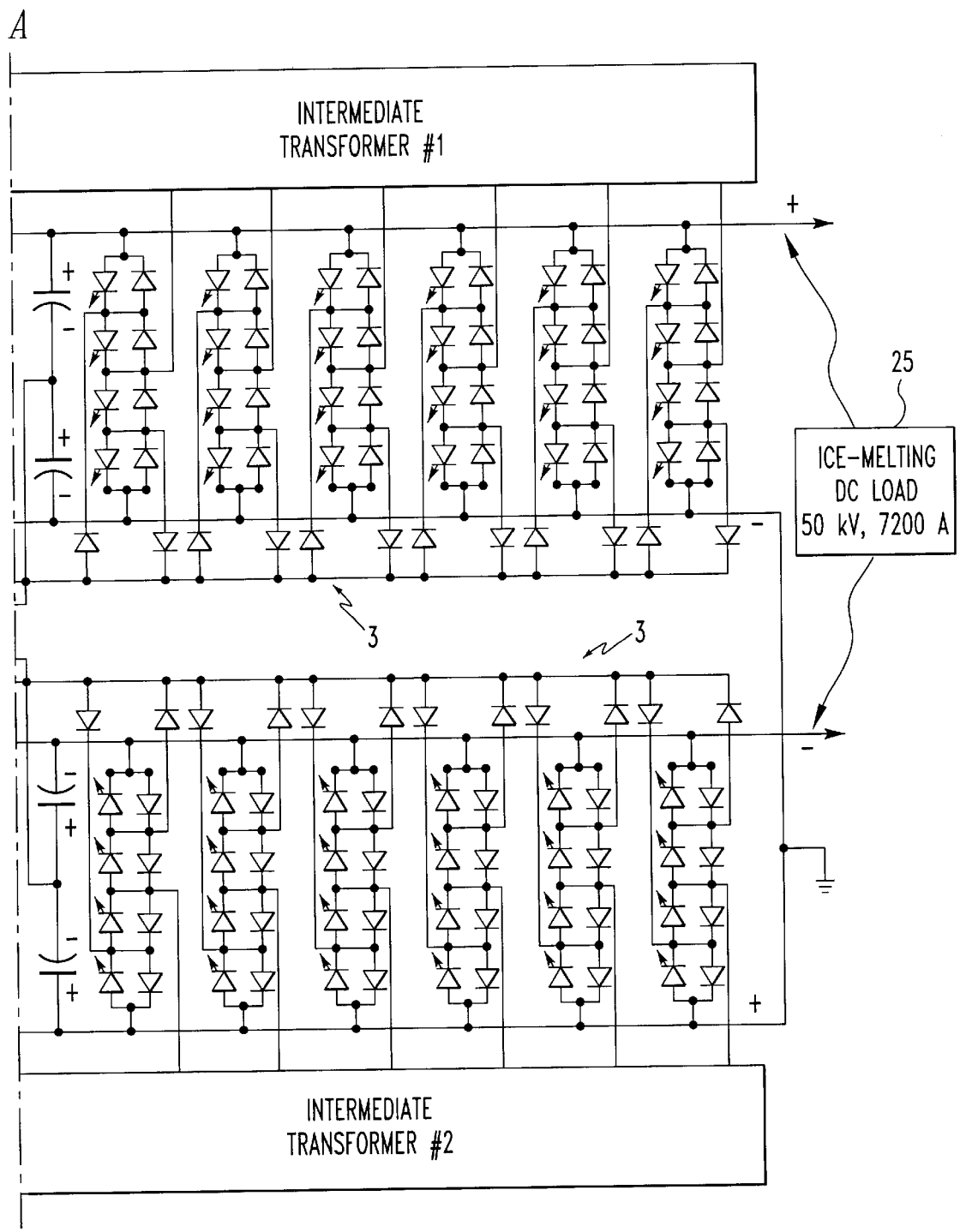

The envisaged full-scale installations would have dc voltage requirements around 50 kV with about the same dc current loading. The same basic concept described above can be extended to the higher power level. In order to achieve the higher dc voltages, two three-level inverters will be connected in series at the dc terminals, as illustrated in FIGS. 7A and 7B. In the STATCOM mode, with appropriate disconnect switches on the dc side open, the two inverters 3 can operate as independent STATCOMs, providing degraded capacity if one unit should be offline for any reason. In this installation the coupling transformers are divided into a main transformer $13_m$ and an intermediate transformer $13_r$.

The dc power regulator of the invention provides a simple and cost effective solution for the ice-melter application and has the following advantages, in particular:
Operation of the inverter as a STATCOM provides good asset utilization during the majority of the time when ice melting is not required
Incremental costs for ice melting capability is relatively small
Changeover procedure is simple and can be accomplished by remote control
The large reactor used provides extremely high quality ac current during ice melting
The large dc bus capacitance ensures high quality dc output voltage regulation The dc regulator of the invention can also be used in other applications where the dc voltage needs to be controlled from between zero and a maximum value.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A dc power regulator for connecting an ac power supply to a dc load and controlling the voltage applied to the dc load, the regulator comprising:
    an inverter having ac terminals and dc terminals;
    an input circuit including an inductance connected between the ac terminals and the ac power supply, the inductance being scaled to maintain current drawn through the ac terminals below a rated maximum level for the inverter when voltage at the ac terminals is zero;
    an output circuit connecting the dc terminals of the inverter to the dc load; and
    a controller controlling the inverter to generate a selected dc voltage at the dc terminals.

2. The regulator of claim 1 wherein the controller controls the inverter to generate the selected voltage at the dc terminals which varies from substantially zero to a selected maximum value.

3. The regulator of claim 2 wherein the controller comprises means controlling a phase angle between voltage on the ac power supply and voltage at the ac terminals of the inverter.

4. The regulator of claim 2 wherein the controller comprises means controlling a ratio of voltage magnitude at the dc terminals of the inverter to voltage magnitude at the ac terminals.

5. The regulator of claim 1 wherein the input circuit includes a first switch device shunting the inductance when closed, and the output circuit includes a second switch device disconnecting the dc load from the dc terminals of the inverter when opened, and the controller operates the inverter to provide reactive compensation to the ac power supply with the first switch device closed and the second switch device open.

6. The regulator of claim 5 wherein the dc load comprises an electric power transmission line which is connected to the dc terminals of the inverter with the second switch device closed.

7. The regulator of claim 6 wherein the inverter comprises a pair of inverters having dc terminals connected in parallel through the second switch device to the electric power transmission line with the second switch device closed.

8. Apparatus for melting ice on an electric power transmission line using power from an ac transmission system, the apparatus comprising:

an inverter having ac terminals and dc terminals;

an input circuit comprising a coupling transformer connected in shunt with the ac transmission system and an inductance connected in series with the ac terminals of the inverter and the coupling transformer, the inductance being scaled to maintain current drawn through the ac terminals of the inverter below a rated maximum level for the inverter when voltage at the ac terminals is zero;

an output circuit connecting the dc terminals of the inverter to the electric power transmission line; and a controller controlling the inverter to produce a dc voltage at the dc terminals selectively variable between about zero and a maximum dc value.

9. The apparatus of claim 8 wherein the input circuit includes a first switch device shunting the inductance when closed, the output circuit includes a second switch device disconnecting the dc terminals of the inverter from the electric power transmission line when open, and the controller operates the inverter to provide reactive compensation to the ac transmission system when the first switch device is closed and the second switch device is open.

10. A method of providing dc power to a load from an ac transmission system, the method comprising the steps of:

connecting a load to the dc terminals of an inverter;

connecting ac terminals of the inverter to the ac transmission system through an inductance having a value sufficient to maintain current drawn through the ac terminals below a rated maximum level for the inverter when the voltage at the ac terminals is zero; and operating the inverter to produce a dc voltage at the dc terminals which varies from about zero up to a maximum dc value.

11. The method of claim 10 wherein the step of operating the inverter comprises phase adjustment of the ac voltage at the ac terminals of the inverter relative to voltage on the ac transmission system.

12. The method of claim 10 wherein the step of operating the inverter comprises generating dc voltage at the dc terminals as a function of the magnitude of the ac voltage, and adjusting the function to adjust the magnitude of the dc voltage.

13. The method of claim 10 comprising disconnecting the dc load from the dc terminals of the inverter, shunting the inductance, and operating the inverter to provide reactive compensation to the ac transmission system.

14. A method of melting ice on an electric power transmission line using power from an ac transmission system, comprising the steps of:

connecting ac terminals of an inverter to the ac transmission system;

connecting dc terminals of the inverter to the electric power transmission line;

operating the inverter to generate a controlled dc voltage at the dc terminals that increases to a selected maximum value and then decreases toward zero; and limiting current provided to the ac terminals of the inverter from the ac transmission system to a rated maximum level.

15. The method of claim 14 wherein limiting current provided to the ac terminals of the inverter comprises connecting in series with the ac terminals, an inductance scaled to limit the ac current provided to the ac terminals of the inverter to the rated maximum level.

16. The method of claim 15 comprising disconnecting the dc terminals from the electric power transmission line, shunting the inductance, and operating the inverter to provide reactive compensation to the ac transmission system.

* * * * *